(12) United States Patent
Seo

(10) Patent No.: US 12,448,722 B2
(45) Date of Patent: *Oct. 21, 2025

(54) FLOW PATH SWITCHING UNIT FOR DRYER AND DRYER INCLUDING THE SAME

(71) Applicant: SAMSUNG ELECTRONICS CO., LTD., Suwon-si (KR)

(72) Inventor: Dongpil Seo, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 136 days.

This patent is subject to a terminal disclaimer.

(21) Appl. No.: 18/541,244

(22) Filed: Dec. 15, 2023

(65) Prior Publication Data

US 2024/0133112 A1 Apr. 25, 2024
US 2024/0229343 A9 Jul. 11, 2024

Related U.S. Application Data

(63) Continuation of application No. PCT/KR2023/016637, filed on Oct. 25, 2023.

(30) Foreign Application Priority Data

Oct. 25, 2022 (KR) .................. 10-2022-0138625
Nov. 11, 2022 (KR) .................. 10-2022-0150976

(51) Int. Cl.
*D06F 58/10* (2006.01)
*D06F 58/04* (2006.01)
*D06F 58/22* (2006.01)

(52) U.S. Cl.
CPC .............. *D06F 58/10* (2013.01); *D06F 58/04* (2013.01); *D06F 58/22* (2013.01)

(58) Field of Classification Search
None
See application file for complete search history.

(56) References Cited

U.S. PATENT DOCUMENTS

2022/0162795 A1 5/2022 Yeom et al.
2022/0372685 A1 11/2022 Lee et al.
2023/0265601 A1 8/2023 Cha et al.

FOREIGN PATENT DOCUMENTS

CN 113529376 A 10/2021
CN 217078113 U 7/2022
(Continued)

OTHER PUBLICATIONS

International Search Report dated Jan. 26, 2024 issued by the International Searching Authority in International Application No. PCT/KR2023/016637.

*Primary Examiner* — Rita P Adhlakha
(74) *Attorney, Agent, or Firm* — Sughrue Mion, PLLC

(57) ABSTRACT

Provided is a flow path switching unit of a dryer configured to dry a drying material. The flow path switching unit includes a body portion, and a flow path guide dividing an internal space of the body portion to selectively form one of a first flow path of air for drying the drying material and a second flow path of air for dehumidifying outside air, according to an arrangement position of the body portion, and at a first position, the path switching unit provides the first flow path to guide air from a drum of the dryer toward a heat exchanger of the dryer, and at a second position, the path switching unit provides the second flow path to guide the outside air introduced from an outside of the dryer.

15 Claims, 16 Drawing Sheets

(56) References Cited

FOREIGN PATENT DOCUMENTS

| | | |
|---|---|---|
| EP | 2 684 994 B1 | 9/2016 |
| EP | 3 562 987 B1 | 10/2021 |
| JP | 3162533 B2 | 5/2001 |
| JP | 2007-319458 A | 12/2007 |
| JP | 2015-062643 A | 4/2015 |
| JP | 2019-30507 A | 2/2019 |
| KR | 20-1998-0066328 U | 12/1998 |
| KR | 10-2021-0046300 A | 4/2021 |
| KR | 10-2022-0069779 A | 5/2022 |
| KR | 10-2022-0069788 A | 5/2022 |
| KR | 10-2022-0069790 A | 5/2022 |

FLOW PATH SWITCHING UNIT FOR DRYER AND DRYER INCLUDING THE SAME

CROSS-REFERENCE TO RELATED APPLICATIONS

This application is by-pass continuation application of International Application No. PCT/KR2023/016637, filed Oct. 25, 2023, which based on and claims priority to Korean Patent Application No. 10-2022-0138625, filed on Oct. 25, 2022, in the Korean Intellectual Property Office, and to Korean Patent Application No 10-2022-0150976, filed Nov. 11, 2022, in the Korean Intellectual Property Office the disclosures of which are incorporated by reference herein in their entireties.

BACKGROUND

1. Field

The disclosure relates to a flow path switching unit for a dryer to selectively provide two flow paths for a drying mode and a dehumidifying mode, and a dryer including the flow path switching unit.

2. Description of Related Art

A dryer is a device for drying wet clothes (hereinafter, referred to a drying material). The drying material is accommodated in a drum in the dryer, and hot air is supplied inside the drum through a heat exchanger while the drum is rotating to dry the drying material.

An existing dryer is installed and used in a laundry room or utility room provided separately in a house, but the laundry room or utility room may not have a window or and/or be small, resulting in poor ventilation. Humidity in the laundry room or utility room may increase due to the drying of the drying material, and high humidity may cause the dryer to corrode or cause discomfort to users.

A dehumidifier may be separately installed in a space where the dryer is installed, which may be inefficient in terms of cost and space. Thus, the dryer may operate in a drying mode or a dehumidifying mode, and a dehumidifying unit for changing a flow path of air may be considered for operation in the drying mode and the dehumidifying mode.

SUMMARY

According to an aspect of the disclosure, a flow path switching unit of a dryer configured to dry a drying material, may include: a body portion including a first surface, a second surface opposite to the first surface, a first side surface, and a second side surface opposite to the first side surface; and a flow path guide dividing an internal space of the body portion to selectively form one of a first flow path of air for drying the drying material and a second flow path of air for dehumidifying outside air, according to an arrangement position of the body portion, wherein, in a state where the body portion is arranged in the dryer at a first position, the flow path switching unit provides the first flow path to guide air from a drum of the dryer toward a heat exchanger of the dryer, wherein, in a state where the body portion is arranged in the dryer at a second position, the flow path switching unit provides the second flow path to guide the outside air introduced from an outside of the dryer toward the heat exchanger and discharge the outside air which has been dehumidified after passing through the heat exchanger and the drum to the outside of the dryer, and wherein, in the first position, the body portion is arranged so that the first surface is a top surface of the body portion and the second surface is a bottom surface of the body portion, and in the second position, the body portion is arranged so that the first surface is the bottom surface of the body portion and the second surface is the top surface of the body portion.

The flow path guide extends from the first side surface to the second side surface, the flow path guide may include: a first inlet at the first side surface and configured to, in the state where the body portion is arranged in the dryer at the first position, receive the air from the drum; and an outlet at a back surface of the body portion and configured to, in the state where the body portion is arranged in the dryer at the first position, output the air toward the heat exchanger, and the first flow path is configured to have the air to flow from the first inlet to the outlet.

The flow path guide extends from the first side surface to the second side surface, the flow path guide may include: a second inlet at the second side surface and configured to, in the state where the body portion is arranged in the dryer at the second position, receive the air from the drum; a separating wall protruding forward from the flow path guide and dividing the body portion into a first region through which the outside air is introduced in the state where the body portion is arranged in the dryer at the second position and a second region through which the outside air is discharged in the state where the body portion is arranged in the dryer at the second position; and an opening configured to be opened and closed in the flow path guide at the first region, and the second flow path is configured such that the outside air introduced through the opening is received through the second inlet after passing through the drum, and then is discharged through the second region.

The flow path switching unit may further include an opening and closing unit coupled to the body portion and configured to open and close a front of the body portion.

The flow path switching unit may further include: an opening and closing unit configured to open and close a front of the body portion; and an airtight member coupled to the opening and closing unit and configured to seal the opening, and the airtight member may be further configured to open the opening when the opening and closing unit opens the front.

The airtight member may have a size corresponding to the opening, and the flow path switching unit further includes a sealing member coupled to a perimeter of the airtight member.

The flow path switching unit may further include a guide grill provided in the second region and configured to guide the air to an outside of the body portion.

The flow path switching unit may further include a guide grill provided in the second region and configured to guide the air to an outside of the body portion, and the guide grill may be further configured to introduce the air in a direction away from the separating wall.

The flow path switching unit may further include an air dispersion rib protruding from a surface of the flow path guide toward the outlet.

The opening and closing unit may be configured to, in the state where the body portion is at the second position, be opened by pivoting of a hinge of the body portion.

A distance between the first side surface and the second side surface of the body portion is greater than a distance between the first surface and the second surface, and the separating wall may be provided a central position between the first side surface and the second side surface.

An area of the outlet may be greater than an area of the first inlet, the area of the outlet may be greater than an area of the opening, and an area of the second region may be greater than an area of the second inlet.

The body portion may include a filter member configured to filter out a foreign substance.

The flow path switching unit may further include a handle configured to rotate the body portion from the first position to the second position, and the handle may be at a front lower side of the body portion in the state where the body portion is at the first position.

According to an aspect of the disclosure, a dryer includes the flow path switching unit.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
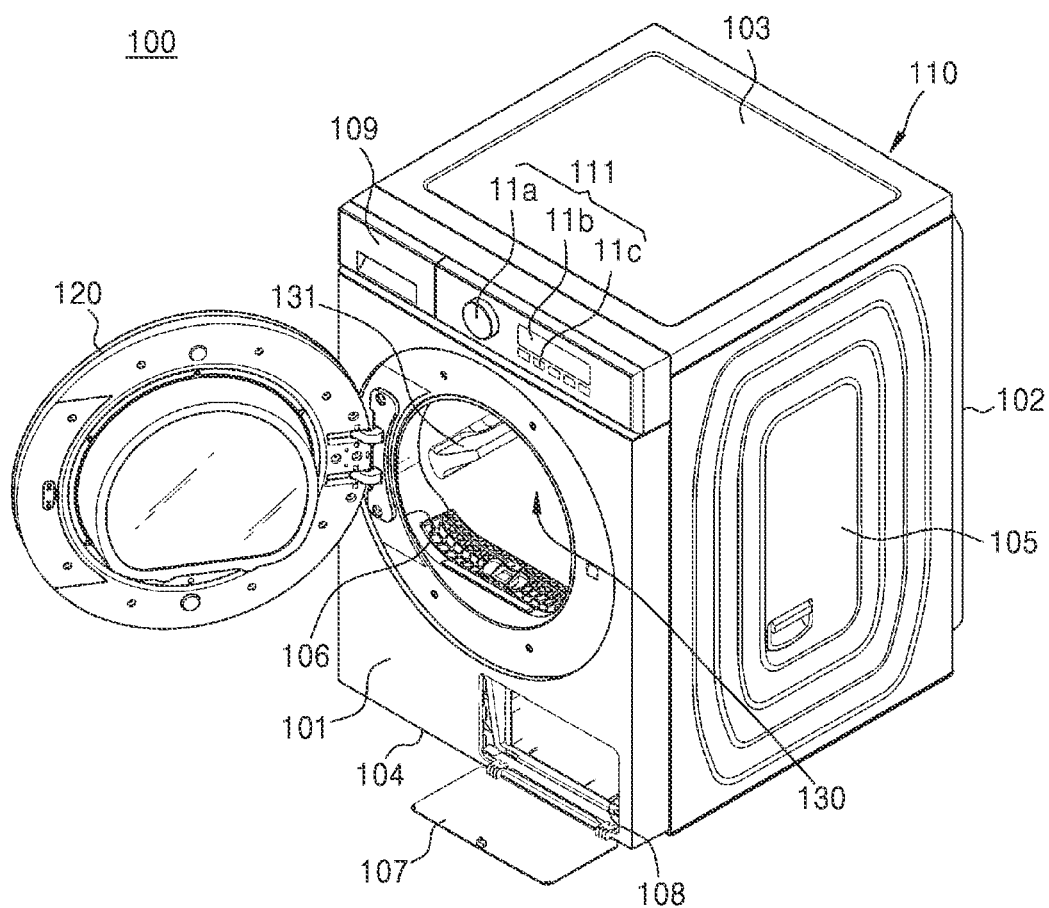
FIG. 1 is a perspective view of a dryer according to an embodiment of the disclosure.

Hereinafter, an example embodiments of the disclosure will be described in detail with reference to the accompanying drawings. The same reference numeral or symbol presented in each drawing represents a part or component that performs substantially the same function.

The terms including "first", "second", etc., may be used to explain various components, but the components are not limited by the terms. These terms may be used to distinguish one element from another element. For example, a first component may be referred to as a second component without departing from the scope of the disclosure, and similarly, the second component may be referred to as the first component. The term "and/or" may include a combination of a plurality of related items or any one of the plurality of related items.

The term used herein is used to describe an embodiment of the disclosure, and is not intended to limit and/or restrict the disclosure. Singular forms include plural forms unless apparently indicated otherwise contextually. Moreover, it should be understood that the term "include", "have", or the like used herein is to indicate the presence of features, numbers, steps, operations, elements, parts, or a combination thereof described in the specifications, and does not preclude the presence or addition of one or more other features, numbers, steps, operations, elements, parts, or a combination thereof. The same reference numeral presented in each drawing represents a member that substantially performs the same function.

Figure 2:
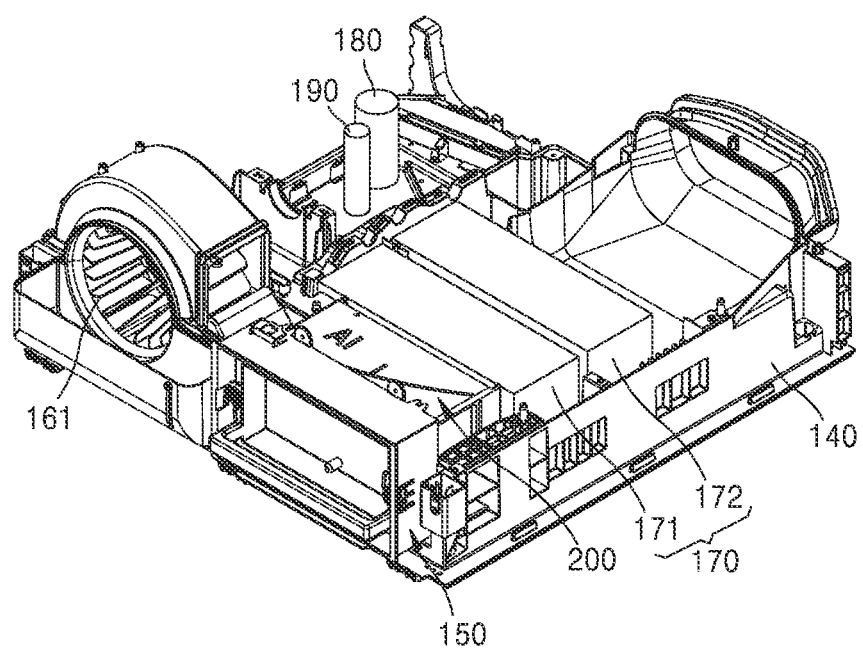
FIG. 2 is a perspective view of a lower portion of FIG. 1.
Figure 3:
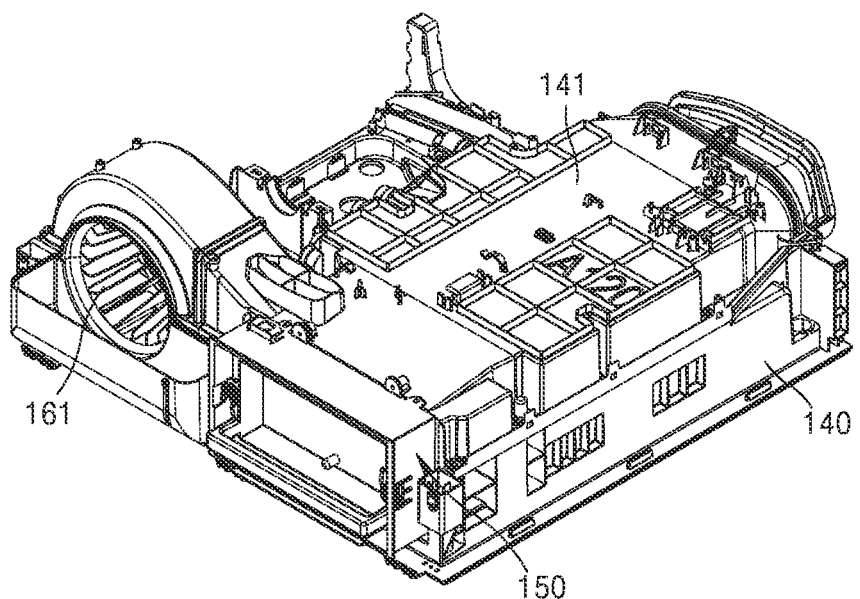
FIG. 3 is a view showing a state where a cover is coupled in FIG. 1.

FIG. 1 is a perspective view of a dryer according to an embodiment of the disclosure. FIG. 2 is a perspective view of a lower portion of FIG. 1, and FIG. 3 is a view showing a state where a cover is coupled in FIG. 1.

Referring to FIG. 1, a direction along an X axis may be defined as a front-back direction, a direction along a Y-axis may be defined as a left-right direction, and a direction along a Z-axis may be defined as an up-down direction. Meanwhile, among the terms used in the following description, the "front-back direction", the "left-right direction", the "up-down direction", etc., are defined based on the drawings, and the shape and position of each component are not limited by these terms.

Referring to FIG. 1, a dryer 100 is a device that operates to dry a drying material. The dryer 100 according to an embodiment of the disclosure may include a main body 110. The main body 110 may be formed in an approximately rectangular parallelepiped shape including a front surface 101, a back surface 102, a top surface 103, a bottom surface 104, and a side surface 105.

The dryer 100 may include a drum 130 accommodating a drying material. The drum 130 may have an opened side through which the drying material is input. In the main body 110, an entrance 106 communicating with the drum 130 may be formed and a door 120 for opening and closing the entrance 106 may be provided.

The drum 130 may be accommodated and mounted in the main body 110 that forms an exterior of the dryer 100. A manipulation unit 111 may be provided in an upper portion of the front surface 101 of the main body 110 to allow a user to perform a function of the dryer 100. In the manipulation unit 111, a rotation-type input unit 11a for selecting the function of the dryer 100, a display unit 11b for displaying a selection function and a mode state of the dryer 100 according to input of the rotation-type input unit 11a, a touch input unit 11c for allowing the user to select a mode by being pressed, etc., may be provided. However, a configuration of the manipulation unit 111 is not limited thereto and may be implemented in various manners.

Referring to FIG. 2, the dryer 100 may include a heat exchanger 170 that provides hot air to the drum 130. The heat exchanger 170 may be disposed under the drum 130, and may be installed on a base 140 provided on the bottom surface 104 of the main body 110. As shown in FIG. 3, a fan 161 installed on the base 140 may move the air of the drum 130 to a flow path switching unit 200, and the heat exchanger 170 may be disposed at a back end of the flow path switching unit 200. A cover 141 may be coupled to an upper portion of the base 140 to form a duct structure that allows air to pass through the flow path switching unit 200 and the heat exchanger 170.

The heat exchanger 170 may supply hot air toward the drum 130 and may be a component constituting a refrigerant cycle. The refrigerant cycle may include the heat exchanger 170, a compressor 180, and an expansion device 190. The heat exchanger 170 may be provided to exchange air with heat and may include an evaporator 171 and a condenser 172. The refrigerant may circulate through a series of processes including compression-condensation-expansion-evaporation.

The compressor 180 may compress a refrigerant into a high-temperature and high-pressure state and discharge the refrigerant, such that the discharged refrigerant is introduced to the condenser 172. The condenser 172 may condense the compressed refrigerant and discharge heat to surroundings during the condensation. In addition, the expansion device 190 may expand the refrigerant in the high-temperature and high-pressure state, condensed by the condenser 172, into a low-pressure state. The evaporator 171 may evaporate the expanded refrigerant and take away heat from the surroundings during the evaporation. The refrigerant passing through the evaporator 171 may move back to the compressor 180 and circulate.

Figure 4:
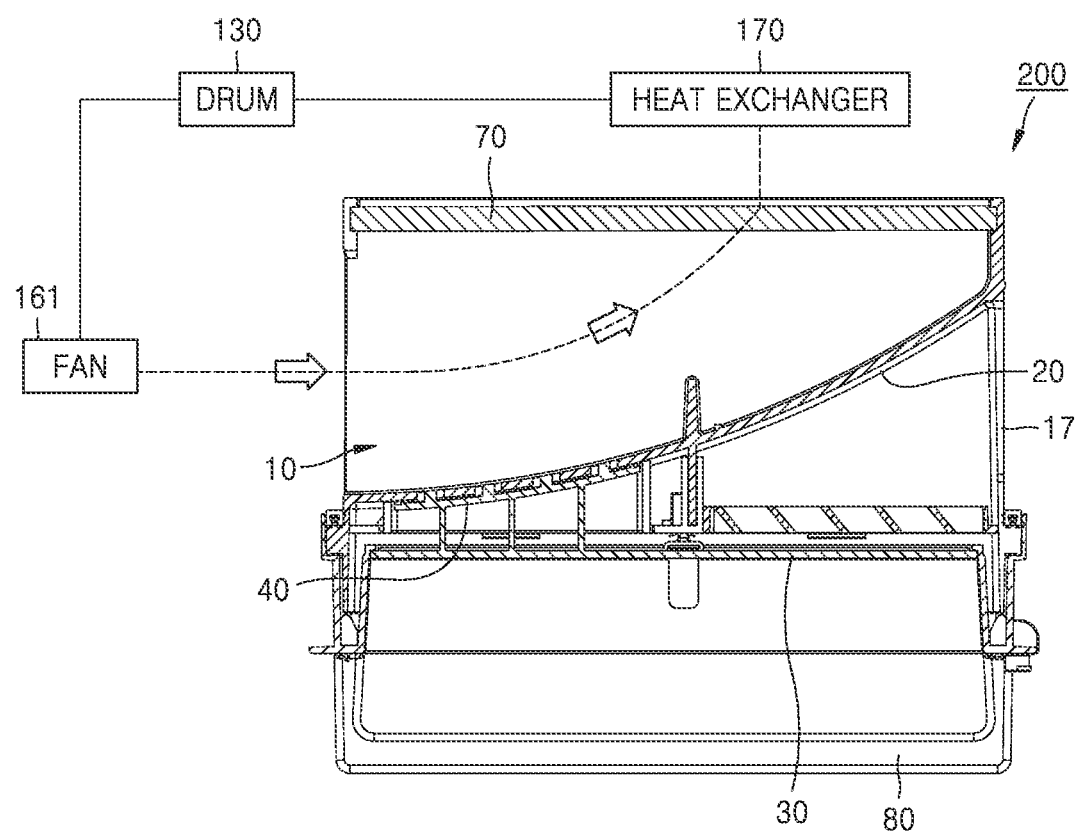
FIG. 4 is a view conceptually showing a flow path in a drying mode.
Figure 5:
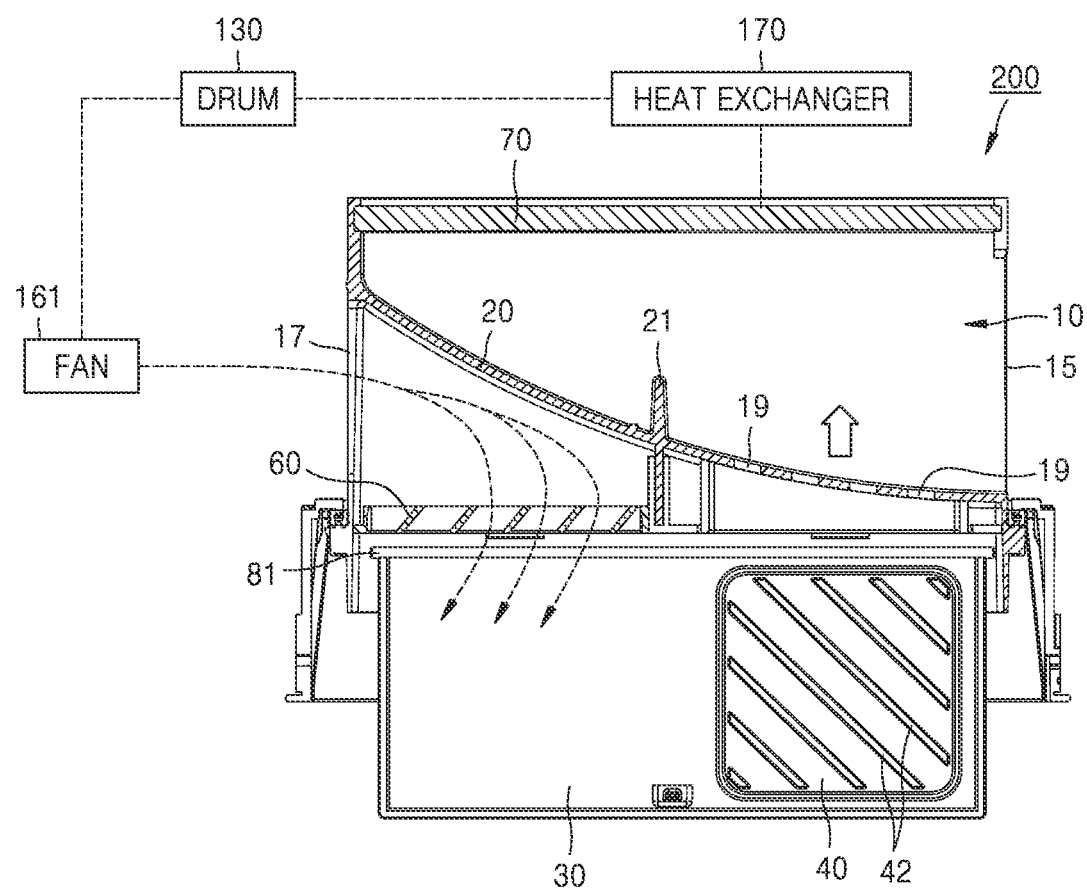
FIG. 5 is a view conceptually showing a flow path in a dehumidifying mode.

FIG. 4 is view conceptually showing a flow path in a drying mode, and FIG. 5 is a view conceptually showing a flow path in a dehumidifying mode.

Referring to FIG. 4, when the dryer 100 operates in a drying mode for drying a drying material, the air may circulate inside the main body 110 to dry the drying material. More specifically, high-temperature and high-humidity air supplied from the drum 130 may be changed into low-temperature dry air while being cooled by passing through the evaporator 171 of the heat exchanger 170. When the high-temperature and high-humidity air is cooled in the evaporator 171, condensed water may be generated. The condensed water may move to a recovery container 109 provided in the dryer 100 or may be drained to the outside of the main body 110.

The low-temperature dry air may pass through the condenser 172 of the heat exchanger 170 while passing through the evaporator 171. The low-temperature dry air discharged from the evaporator 171 may be heated up and changed into high-temperature dry air while passing through the condenser 172. The high-temperature dry air may be introduced to the back side of the drum 130 to dry the drying material. As the drying material is dried, the high-temperature and high-humidity air containing moisture may leak from the drum 130 and pass through the evaporator 171 again. In this way, the air circulating inside the main body 110 may dry the drying material accommodated in the drum 130.

Referring to FIG. 5, when the dryer 100 operates in the dehumidifying mode for dehumidifying outside air, air outside the dryer 100 may be introduced into the dryer 100 and dehumidified and then discharged to the outside of the dryer 100. More specifically, the air outside the dryer 100 may be introduced into the dryer 100 and may be dehumidified while being discharged to the outside of the dryer 100 after passing through the heat exchanger 170 and the drum 130.

The high-humidity air needing to be dehumidified may be changed into high-temperature dry air while passing through the heat exchanger 170. The high-temperature dry air may pass through the drum 130 and then may be discharged again to the outside of the dryer 100, such that the high-humidity air outside the dryer 100 may be dehumidified. The dehumidifying mode may operate in a state where any drying material is not accommodated inside the drum 130.

As such, the air circulates inside the main body 110 in the drying mode, and the outside air is introduced and discharged to outside via the heat exchanger 170 and the drum 130 in the dehumidifying mode. The flow path switching unit 200 for the dryer according to an embodiment of the disclosure may be attachably and detachably coupled to the dryer 100 to selectively form a first flow path for the drying mode and a second flow path for the dehumidifying mode. The flow path switching unit 200 for the dryer 100 may be engaged by being inserted into a mounting hole 108 formed in the main body 110. The mounting hole 108 may be opened and closed by a cover 107. Hereinbelow, the flow path switching unit 200 for the dryer 100 will be described in detail.

Figure 6:
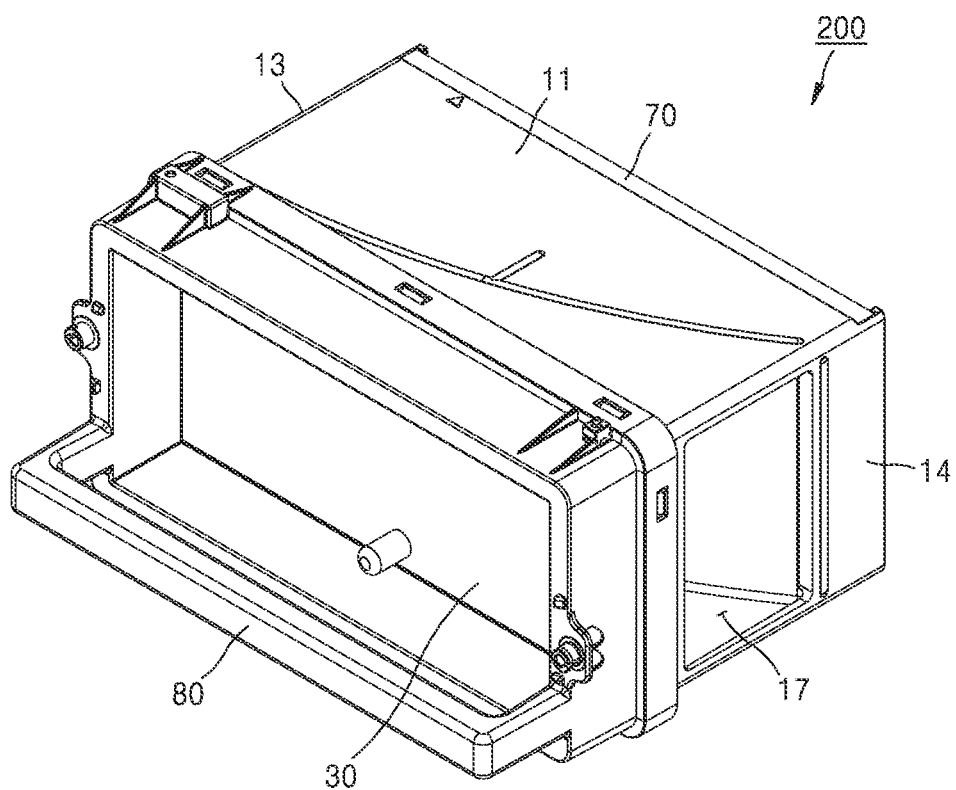
FIG. 6 is a perspective view of a flow path switching unit according to an embodiment of the disclosure at a first position.
Figure 7:
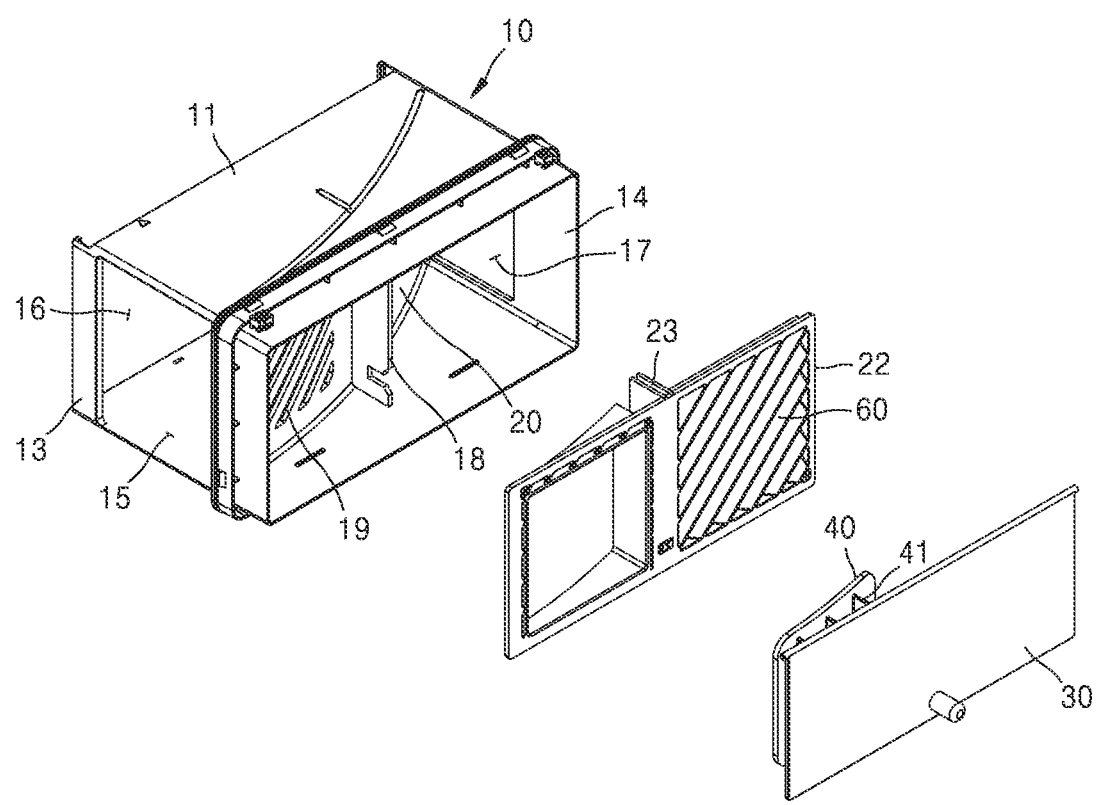
FIG. 7 is an exploded perspective view of a flow path switching unit at a first position.
Figure 8:
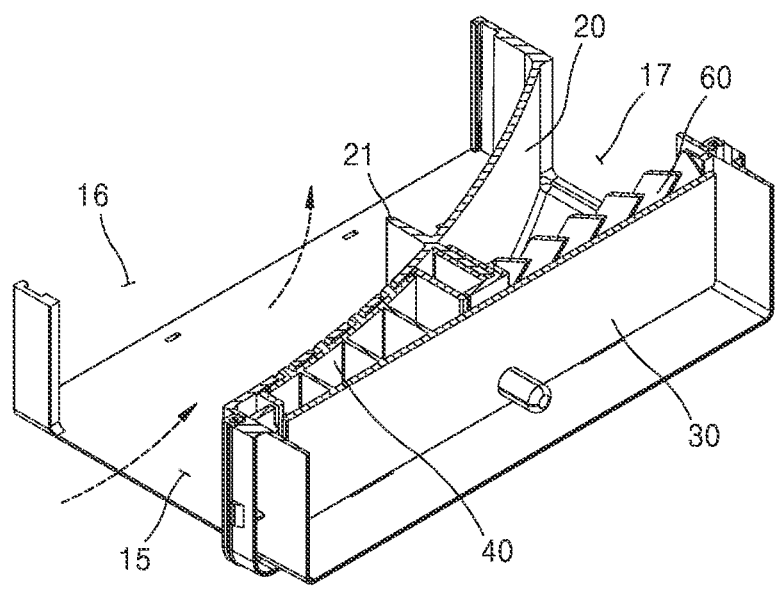
FIG. 8 is a cross-sectional view of the flow path switching unit FIG. 7.
Figure 10:
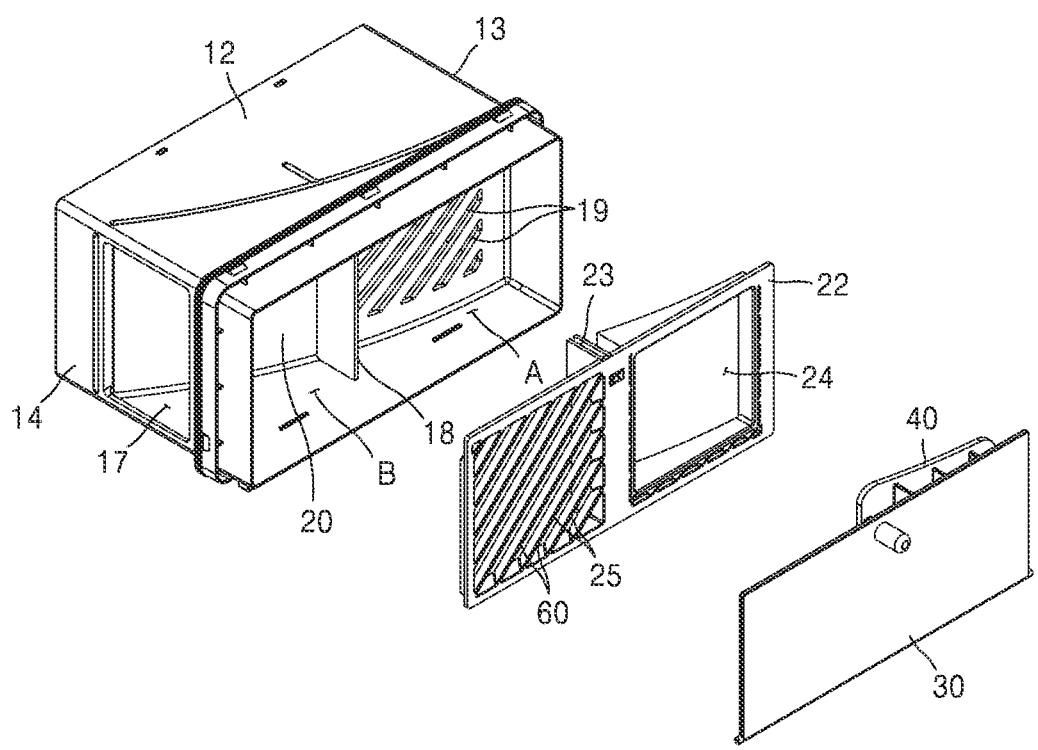
FIG. 10 is an exploded perspective view of a flow path switching unit at a second position.
Figure 11:
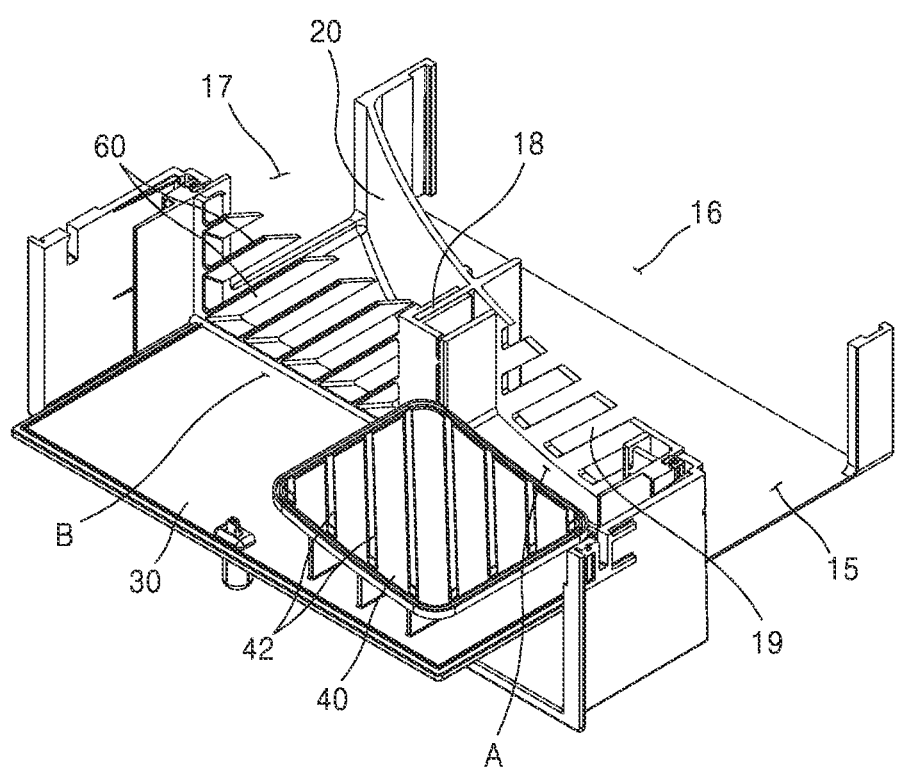
FIG. 11 is a cross-sectional view of a state where an opening/closing portion is opened in FIG. 10.

FIG. 6 is a perspective view of the flow path switching unit 200 according to an embodiment of the disclosure at a first position. FIG. 7 is an exploded perspective view of the flow path switching unit 200 at the first position, and FIG. 8 is a cross-sectional view of FIG. 7. FIG. 10 is an exploded perspective view of the flow path switching unit 200 at a second position, and FIG. 11 is a cross-sectional view where an opening and closing unit is opened in FIG. 10.

The first position may mean a position in a state where the flow path switching unit 200 for the dryer 100 is coupled to the dryer 100 to perform a drying operation, and the second position may mean a position in a state where the flow path switching unit 200 for the dryer 100 is coupled to the dryer 100 to perform a dehumidifying operation.

The flow path switching unit 200 for the dryer 100 according to an embodiment of the disclosure may include a body portion 10 and a flow path guide 20.

Referring to FIG. 6, the body portion 10 may include a top surface 11, a bottom surface 12, a first side surface 13, and a second side surface 14. The first side surface 13 is opposite to the second side surface 14 across the body portion 10. According to an embodiment of the disclosure, the body portion 10 may have a rectangular parallelepiped shape with opened front surface and back surface. When viewed from the front surface, the body portion 10 may have a width in a horizontal direction greater than a height in a vertical direction. As the body portion 10 is formed to have the width in the horizontal direction greater than the height in the vertical direction, the space utilization of a lower portion of the dryer 100 may be improved. As shown in FIG. 1, as the drum 130 is provided in a central portion of the main body 110 of the dryer 100 and the flow path switching unit 200 is provided in the space of the lower portion of the main body 110, the height of the body portion 10 may be reduced to minimize interference with other structures.

Moreover, the body portion 10 may be formed such that a distance between the opposite first side surface 13 and second side surface 14 is greater than a distance in a front and a back thereof. By reducing the distance in the front-back direction in the body portion 10, an arrangement space of a structure provided in the back side of the body portion 10, e.g., the heat exchanger 170 may be effectively secured. A relatively long distance between the opposite first side surface 13 and second side surface 14 of the body portion 10 may be secured, thereby sufficiently securing a size of each region when dividing the body portion 10 into a first region A and a second region B at the second position. The shape of the body portion 10 is not limited to the above-described rectangular parallelepiped shape and may be changed variously as long as it is capable of forming a flow path in which air flows.

The flow path guide 20 may guide the air by partitioning an internal space of the body portion 10. The flow path guide 20 may be coupled to an inside of the body portion 10 to divide the internal space of the body portion 10, in which the divided space may be used as a flow path for the drying mode or the dehumidifying mode.

More specifically, the flow path guide 20 may form a first flow path for drying the drying material or a second flow path for dehumidifying the outside air. That is, the flow path guide 20 may form the first flow path in the drying mode and the second flow path in the dehumidifying mode.

Referring to FIG. 7 and FIG. 8, the flow path guide 20 may provide the first flow path for guiding the air from the drum 130 toward the heat exchanger 170 in a state where the body portion 10 is at the first position. Referring to FIG. 10 and FIG. 11, the flow path guide 20 may provide the second flow path in which in a state where the body portion 10 is at the second position, after outside air is introduced and dehumidified via the heat exchanger 170 and the drum 130, the outside air is introduced back to the body portion 10 from the drum 130 and is discharged to outside.

In this case, the second position of the body portion 10 may be a position of the body portion 10 such that the body portion 10 is 180° rotated and thus positions of the top surface and the bottom surface are reversed from the first position. When the body portion 10 is viewed from the front surface thereof, the second position may be a position of the body portion 10 such that the body portion 10 is rotated in a clockwise direction or a counterclockwise direction with respect to a center of the front surface of the body portion 10 and thus the top surface becomes the bottom surface and the bottom surface becomes the top surface.

Referring to FIG. 7 and FIG. 10, to the front of the body portion 10 is coupled a front cover 22 having formed thereon an inlet port 24 through which the outside air is introduced and an outlet port 25 through which the outside air is discharged. The inlet port 24 and the outlet port 25 may be formed to have substantially the same size to facilitate flow of the air in introduction and discharge of the outside air. A guide rib 26 supported in contact with the flow path guide 20 while guiding the outside air to an opening 19 may be formed to protrude on the inlet port 24. The guide rib 26 may be formed to have a curvature corresponding to a curvature of the flow path guide 20.

According to an embodiment of the disclosure, the flow path guide 20 may extend from the front of any one of the opposite first side surface 13 and second side surface 14 to the back of the other of the opposite first side surface 13 and second side surface 14.

As shown in FIG. 7, the flow path guide 20 may extend from the front of the (left) first side surface 13 to the back of the (right) second side surface 14. An end of the flow path guide 20 may be coupled to the front of the (left) first side surface 13 and the other end may be coupled to the back of the (right) second side surface 14. The flow path guide 20 may be formed round to facilitate flow of the air. While the other end of the flow path guide 20 is coupled to the back of the right side surface 14 in FIG. 7, the other end of the flow path guide 20 may be coupled to a corner in which the back surface of the body portion 10 meets the right side surface 14 or to the back surface adjacent the corner.

A first inlet 15 and an outlet 16 may be formed in the body portion 10. More specifically, with respect to the state where the body portion 10 is at the first position, the first inlet 15 may be formed on the side surface to allow the air to be introduced from the drum 130. The outlet 16 may be formed at the back of the body portion 10.

The air introduced from the first inlet 15 may form the first flow path while flowing to the outlet 16. According to an embodiment of the disclosure, an area of the outlet 16 may be greater than that of the first inlet 15. As the area of the outlet 16 is greater than that of the first inlet 15, the air introduced through the first inlet 15 may be smoothly discharged through the outlet 16.

Referring to FIG. 8, the first inlet 15 may be formed on the (left) first side surface 13 of the body portion 10 coupled to the end of the flow path guide 20. The outlet 16 may be formed on the back surface of the body portion 10, such that the air from the drum 130 may be introduced to the (left) first side surface 13 in which the first inlet 15 is formed and is discharged to the back where the outlet 16 is provided.

According to an embodiment of the disclosure, as shown in FIG. 1 and FIG. 2, the flow path switching unit 200 may be coupled to a mounting portion 150 provided on a right lower portion of the main body 110 when viewed from the front surface 101 of the main body 110. The drum 130 may be positioned in the central portion of the main body 110, and the flow path switching unit 200 may be formed to the right of the drum 130, such that the first inlet 15 may be formed on the (left) first side surface 13 of the body portion 10, thus simplifying the flow path of the air discharged from the drum 130.

Figure 9:
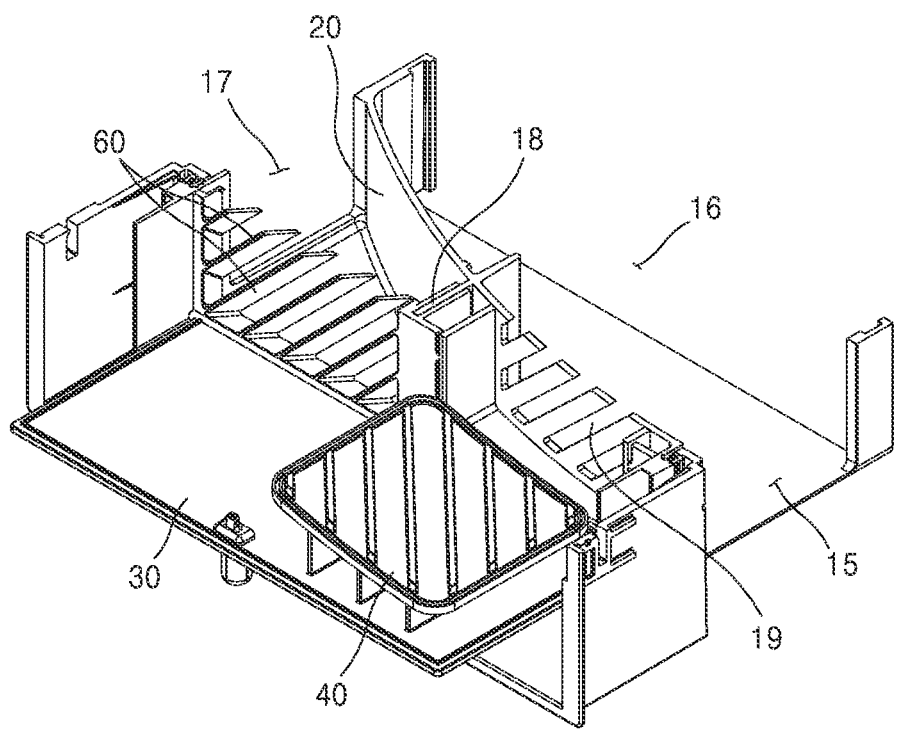
FIG. 9 is a cross-sectional view at a first position when a flow path switching unit is installed in a left lower portion of a main body of a dryer, according to an embodiment of the disclosure.

As shown in FIG. 9, when the flow path switching unit 200 is coupled to the left lower portion of the main body 110, the flow path guide 20 formed in the body portion 10 may be formed round to the back of the (left) first side surface 13 from the front of the (right) second side surface 14. That is, an end of the flow path guide 20 may be coupled to the front of the (right) second side surface 14 and the other end may be coupled to the back of the (left) first side surface 13. The other end of the flow path guide 20 may be coupled to a corner at which the (left) first side surface 13 meets the back surface or to the back surface adjacent to the corner.

In this case, the first inlet 15 may be formed on the (right) side surface 14 and the outlet 16 may be formed on the back surface of the body portion 10. That is, in an embodiment of the disclosure, the flow path guide 20, the first inlet 15, and the outlet 16 may be changed symmetrically to a structure of FIG. 7. When the main body 110 is viewed from the front surface 101, for this structure being a structure in which the flow path switching unit 200 is engaged with the left lower portion of the front surface 101 of the main body 110, a flow path introduced from the drum 130 may be simplified and applied.

In addition, an air dispersion rib 21 may be formed in the flow path guide 20. The air dispersion rib 21 may protrude from a surface of the flow path guide 20 to the outlet 16 with respect to the state where the body portion 10 is at the first position. As the air introduced through the first inlet 15 is injected in collision with the air dispersion rib 21, the air may flow to the outlet 16. The air may be dispersed by the air dispersion rib 21 and smoothly escape to the heat exchanger 170 through the outlet 16.

According to an embodiment of the disclosure, the body portion 10 may include a second inlet 17, a separating wall 18, and the opening 19.

The flow path guide 20 may extend from the front of any one of the opposite first side surface 13 and second side surface 14 to the back of the other of the opposite first side surface 13 and second side surface 14, and the second inlet 17 may be formed on the other side surface to introduce the air from the drum 130 with respect to the state where the body portion 10 is at the second position. When the body portion 10 is reversed upside down from the first position of FIG. 7, the body portion 10 may be changed to the second position of FIG. 10. As shown in FIG. 10, when the body portion 10 is reversed to the second position, the second inlet 17 may be provided to the left like the first inlet 15 at the first position.

In an embodiment of the disclosure, when the main body 110 is viewed from the front surface thereof, the flow path switching unit 200 may be coupled to the right lower portion of the front surface of the main body 110, such that the second inlet 17 may allow the air to be easily introduced therethrough from the drum 130 provided in the central portion of the main body 110. This result may be because the top surface and the bottom surface of the flow path switching unit 200 are 180° reversed such that the second inlet 17 moves from the first position to the position of the first inlet 15.

More specifically, referring to FIG. 8, with respect to the first position, the flow path guide 20 may extend from the front of the (left) first side surface 13 to the back of the (right) second side surface 14, in which the second inlet 17 may be formed on the (right) second side surface 14 and the first inlet 15 may be formed on the (left) first side surface 13. With this structure, the second inlet 17 may be formed on the opposite side of the first inlet 15. When the first inlet 15 is formed on the (right) second side surface 14, the second inlet 17 may be formed on the (left) first side surface 13.

In the flow path in which the air introduced through the first inlet 15 flows through the outlet 16, a surface of the flow path guide 20 may be used. On the other hand, the air introduced through the second inlet 17 may flow along the other surface of the flow path guide 20.

The separating wall 18 may be provided to protrude from the back to the front from the flow path guide 20. The separating wall 18 may divide the front surface of the body portion 10 into the first region A through which the outside air is introduced and the second region B through which the outside air is discharged.

In an embodiment of the disclosure, the separating wall 18 may be formed at the center of the opposite first side surface 13 and second side surface 14 of the body portion 10. The separating wall 18 may be formed at the center of the opposite first side surface 13 and second side surface 14 such that the first region A and the second region B may have substantially the same size and a flow rate of the outside air introduced and a flow rate of the outside air discharged may be made similar to each other, facilitating a flow of the air.

As shown in FIG. 10, when the body portion 10 is at the second position, the right side of the separating wall 18 may form the first region A into which the outside air is introduced and the left side of the separating wall 18 may form the second region B from which the outside air is discharged.

According to an embodiment of the disclosure, an area of the second region B may be greater than that of the second inlet 17. As the area of the second region B is greater than that of the second inlet 17, the air introduced from the drum 130 through the second inlet 17 may be smoothly discharged to outside through the second region B.

The opening 19 may be provided to be opened and closed in the flow path guide 20 corresponding to the first region A. As shown in FIG. 7, FIG. 8, FIG. 9, and FIG. 10, according to an embodiment of the disclosure, the opening 19 may be formed as a hole cut in an approximately comb teeth shape. The opening 19 formed obliquely in the comb teeth shape in this way may provide the effect of primarily filtering out a foreign substance included in the outside air. However, the shape of the opening 19 is not limited thereto, and the opening 19 may have a size and a shape that are sufficient for the introduction of the air into the body portion 10. For example, the opening 19 may have a shape in which a plurality of circular through-holes are formed in the flow path guide 20 or bars arranged in the horizontal and vertical directions are arranged in a grid.

The second flow path may be formed such that the outside air is introduced to the body portion 10 through the opening 19, is introduced back to the body portion 10 through the second inlet 17 via the heat exchanger 170 and the drum 130, and then is discharged through the second region B.

According to an embodiment of the disclosure, an area of the opening 19 may be less than that of the outlet 16. As the area of the outlet 16 is greater than that of the opening 19, the outside air introduced through the opening 19 may be smoothly discharged to the heat exchanger 170 through the outlet 16.

Figure 12:
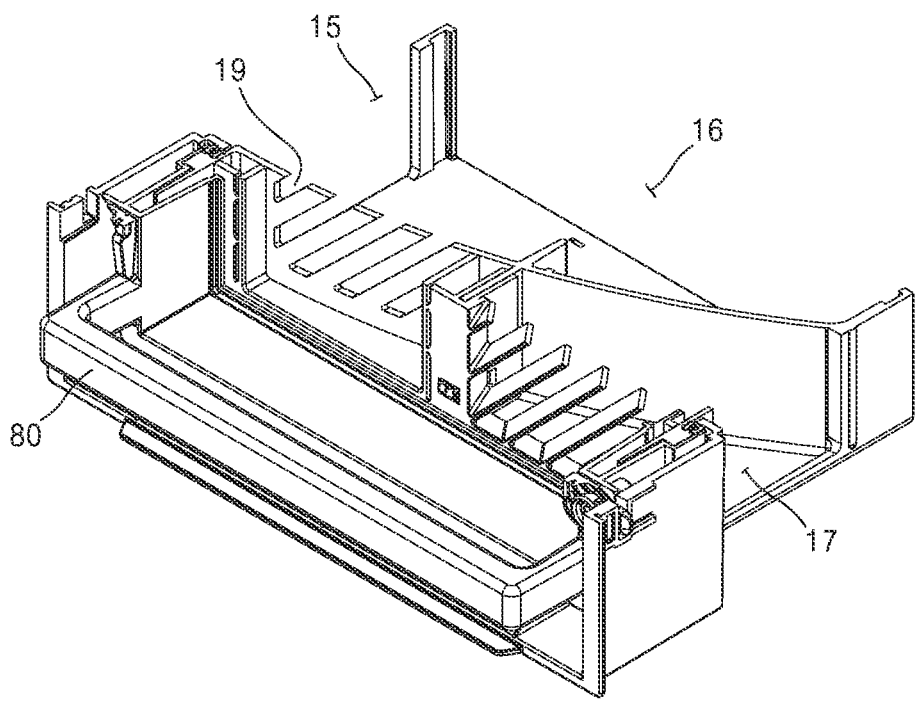
FIG. 12 is a cross-sectional view at a first position when a flow path switching unit is installed in a left lower portion of a main body of a dryer, according to an embodiment of the disclosure.

As shown in FIG. 9, when the flow path guide 20 extends roundly from the front of the (right) second side surface 14 to the back of the (left) first side surface 13 at the first position, the first inlet 15 may be formed on the right side surface 14 of the body portion 10, the outlet 16 may be formed on the back surface of the body portion 10, and the second inlet 17 may be formed on the left side surface 13 of the body portion 10. In an example where the first position is in the state shown in FIG. 9, the flow path switching unit 200 may enter a state shown in FIG. 12 upon switching to the second position. Referring to FIG. 12, when the body portion 10 is at the second position, the first region A may be a left region on the front surface of the body portion 10 divided by the separating wall 18 and the second region B may be a right region on the front surface of the body portion 10. According to FIG. 9, the end of the flow path guide 20 may be coupled to the front of the (right) second side surface 14 of the body portion 10 and the other end may be coupled to the back of the (left) first side surface 13 of the body portion 10, but the other end of the flow path guide 20 may be coupled to the corner at which the (left) first side surface 13 of the body portion 10 meets the back surface or to the back surface of the body portion 10 adjacent to the corner.

Figure 13:
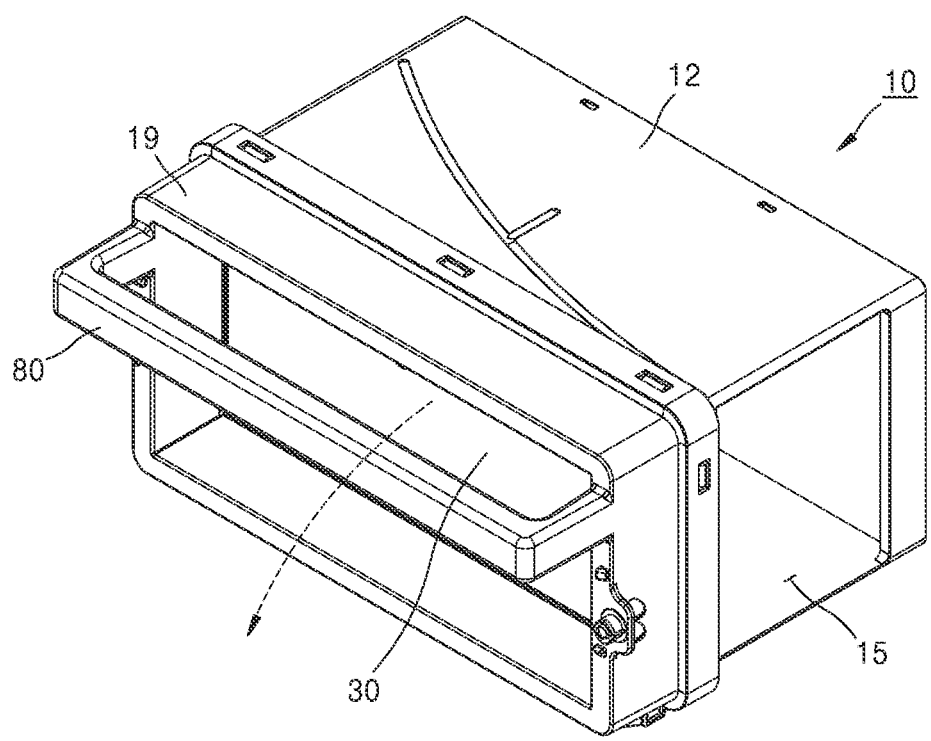
FIG. 13 is a perspective view of a flow path switching unit at a second position.
Figure 14:
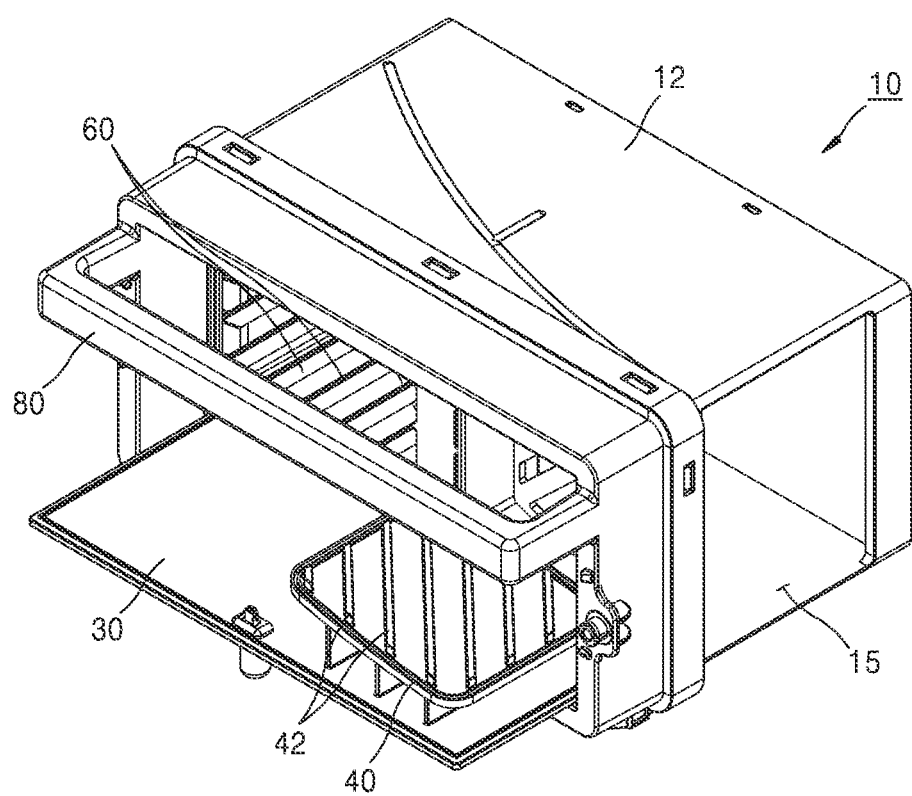
FIG. 14 is a perspective view of a state where an opening/closing portion is opened in FIG. 13.
Figure 15:
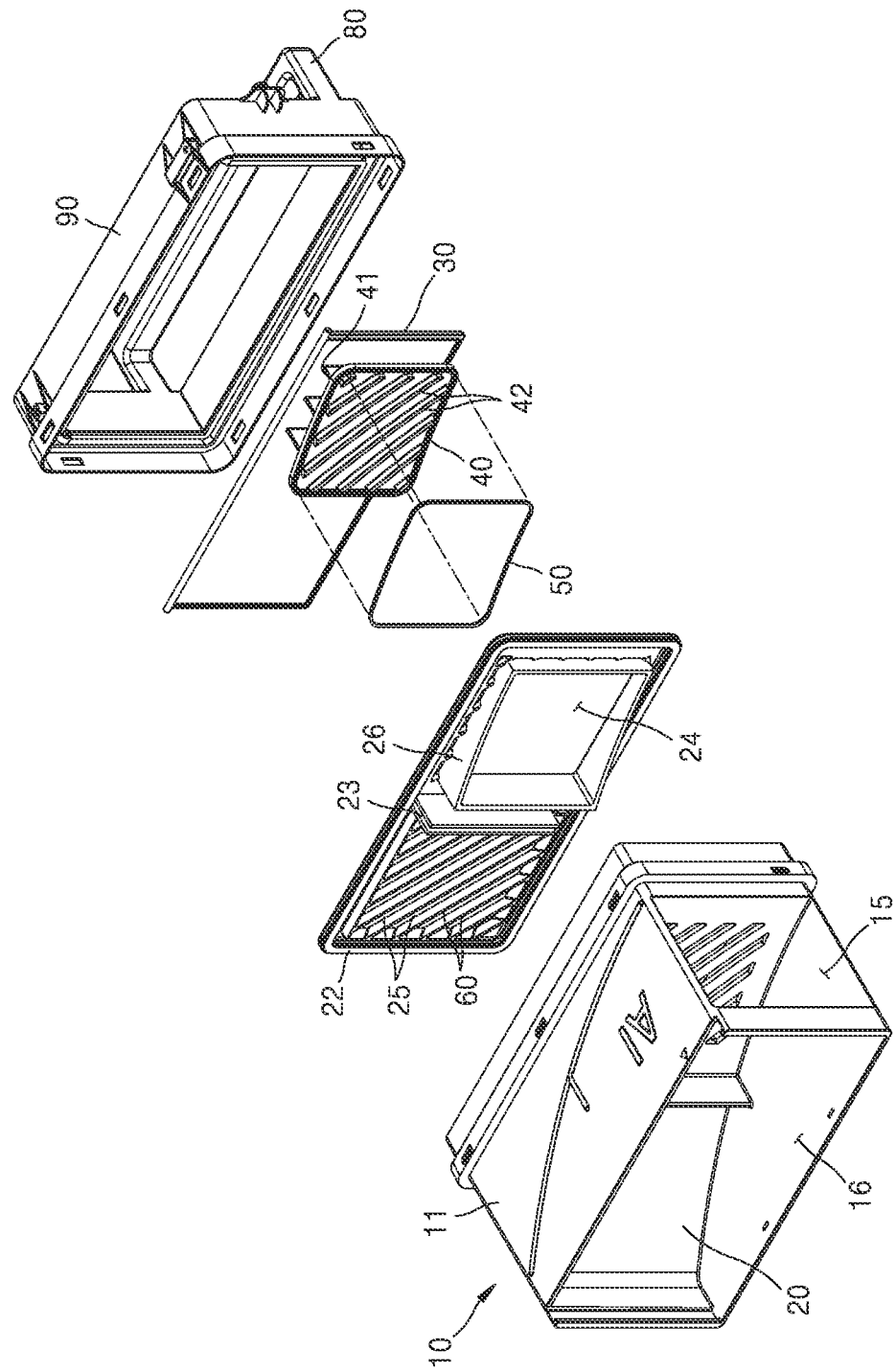
FIG. 15 is an exploded perspective view viewed from the back of a flow path switching unit toward the front thereof.
Figure 16:
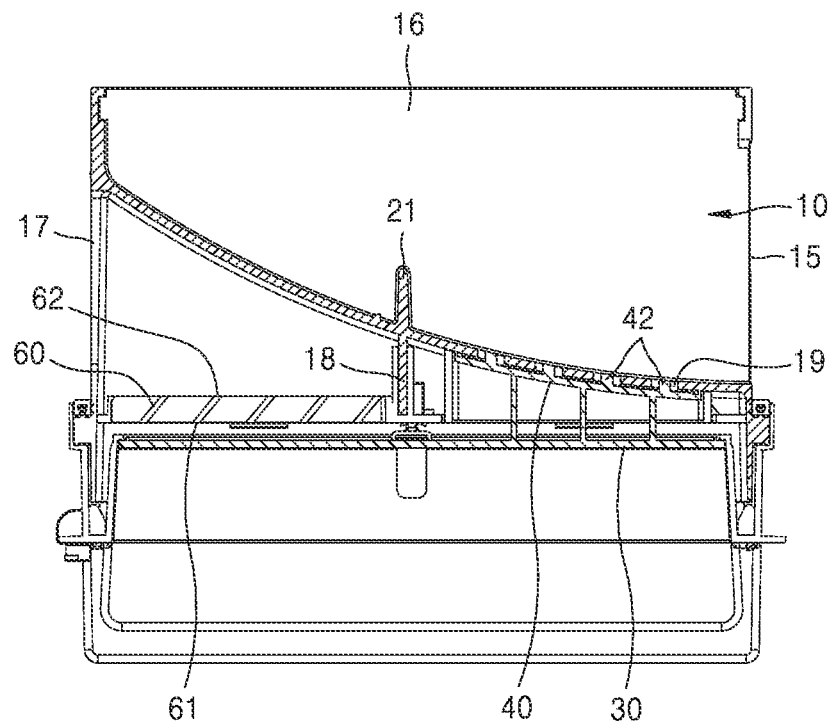
FIG. 16 is a plane view of the flow path switching unit of FIG. 11.

FIG. 13 is a perspective view of a flow path switching unit at a second position, and FIG. 14 is a perspective view of a state where an opening and closing unit is opened at the second position in FIG. 13. FIG. 15 is an exploded perspective view viewed from a back of a flow path switching unit toward a front thereof, and FIG. 16 is a plane view of FIG. 11.

As shown in FIG. 13, an opening and closing unit 30 for opening and closing the front of the body portion 10 may be coupled to the flow path switching unit 200 for the dryer 100 according to an embodiment of the disclosure. The opening and closing unit 30 may open or close the first region A and the second region B divided by the separating wall 18. When the body portion 10 is provided in the drying mode in a state of being at the first position, the opening and closing unit 30 may maintain a state of closing the front of the body portion 10. When the body portion 10 is provided in the dehumidifying mode in a state of being at the second position, the opening and closing unit 30 may maintain a state of opening the front of the body portion 10.

According to an embodiment of the disclosure, as shown in FIG. 14, the opening and closing unit 30 may be opened by pivoting with respect to a hinge 81 provided in opposite lower ends in a state where the body portion 10 is at the second position. That is, the opening and closing unit 30 may be structured to open the first region A and the second region B as a lower end pivots by pulling an upper side of the opening and closing unit 30 forward in the state of being at the second position. In the front cover 22 may be formed a receiving portion 23 into which the separating wall 18 is received by being inserted. When the front cover 22 is coupled to the body portion 10, the separating wall 18 may be stably positioned by being inserted into the receiving portion 23.

According to an embodiment of the disclosure, an airtight member 40 for sealing the opening 19 may be coupled to the opening and closing unit 30. The airtight member 40 may be connected to the opening and closing unit 30 to open the opening 19 when the opening and closing unit 30 opens the front of the body portion 10. The opening and closing unit 30 and the airtight member 40 may be fixed by a connection bar 41 formed integrally. In the airtight member 40 may be formed a protrusion 42 inserted into the opening 19 when the opening and closing unit 30 closes the opening 19.

The airtight member 40 may be formed to have a size corresponding to the opening 19. According to an embodiment of the disclosure, as the opening 19 is formed in an approximately rectangular shape, the airtight member 40 may be formed in a rectangular shape to block the opening 19. When the shape of the opening 19 is changed, the shape of the airtight member 40 may also be changed.

The airtight member 40 may have a curved surface corresponding to a curved surface of the flow path guide 20. When the airtight member 40 closes the opening 19, the airtight member 40 may form a first flow path together with the flow path guide 20. Thus, an outer surface of the airtight member 40 may be formed to form one curved surface by extending a curved surface of the flow path guide 20.

Referring to FIG. 15, a sealing member 50 may be coupled in a circumferential direction of the airtight member 40. As the sealing member 50 is coupled in the circumferential direction of the airtight member 40, the sealing member 50 may effectively preventing leakage of air by integrally sealing a circumferential surface of the opening 19. That is, when the body portion 10 is provided in the drying mode at the first position, the airtight member 40 may maintain a state of sealing the opening 19. When the air flows to the heat exchanger 170 from the drum 130 along the flow path guide 20, surface sealing may be performed in the circumferential direction of the airtight member 40 to effectively prevent leakage of the air through the opening 19. The sealing member 50 may include a rubber or silicon material, etc. A material of the sealing member 50 may not be limited thereto, and various materials may be selected.

Referring to FIG. 10, FIG. 11, FIG. 12, FIG. 13, FIG. 14, and FIG. 15, the flow path switching unit 200 for the dryer 100 according to an embodiment of the disclosure may include a guide grill 60.

The guide grill 60 may be provided in the second region B to guide air discharged to outside through the second region B. The guide grill 60 may guide the air discharged through the second region B in a direction away from the separating wall 18. According to an embodiment of the disclosure, the guide grill 60 may be provided in an oblique shape in the outlet port 25 of the front cover 22.

As shown in FIG. 16, the guide grill 60 may be provided in a way that band-shaped members with a certain width are separated from each other, and the air may flow between the band-shaped members. A front end of the guide grill 60 may be formed inclinedly in a direction away from the separating wall 18 toward the front of the body portion 10. That is, a front end 61 may be more spaced apart from the separating wall 18 than a back end 62 with respect to a width of the guide grill 60. As the air discharged along the guide grill 60 is discharged in a direction away from the separating wall 18, it is possible to prevent the air discharged through the second region B from being re-introduced to the first region A and minimize interference with the outside air introduced through the first region A.

According to an embodiment of the disclosure, the guide grill 60 may be disposed inclinedly in a direction away from the separating wall 18 toward a lower end of the guide grill 60 from an upper end thereof in a vertical longitudinal direction. As the guide grill 60 is formed inclinedly such that the lower end thereof is away from the separating wall 18, the air passing through the guide grill 60 may be discharged effectively away from the separating wall 18.

The flow path switching unit 200 for the dryer 100 according to an embodiment of the disclosure may include a filter member 70.

The filter member 70 may be coupled to the back of the body portion 10 to filter out a foreign substance included in the flowing air. According to an embodiment of the disclosure, the filter member 70 may be attachably and detachably coupled to the outlet 16. The filter member 70 may be formed to have a shape and a size corresponding to the outlet 16.

The filter member 70 may filter out a foreign substance included in the air circulating inside the main body 110 when the dryer 100 operates in the drying mode as the body portion 10 is at the first position. In the drying mode, as the air introduced through the first inlet 15 exits through the outlet 16, the foreign substance included in the air circulating inside the main body 110 may be filtered out by the filter member 70. In the dehumidifying mode, as the outside air introduced through the opening 19 exits through the outlet 16, the foreign substance included in the outside air may be filtered out by the filter member 70.

The flow path switching unit 200 for the dryer 100 according to an embodiment of the disclosure may include a handle 80.

The handle 80 may be provided to separate the body portion 10 from the main body 110 and rotate the body portion 10 from the first position to the second position. The handle 80 may be formed in a front lower side of the body portion 10 in the state where the body portion 10 is at the first position. According to an embodiment of the disclosure, the front of the body portion 10 may include a fixing unit 90 for engaging the flow path switching unit 200 to the mounting portion 150, and the handle 80 may be provided in the fixing unit 90.

As such, when the body portion 10 is at the first position, a user may separate the body portion 10 from the main body 110 by using the handle 80. Then, the body portion 10 may be 180° rotated such that a top surface and a bottom surface thereof are reversed. In a state where the position of the body portion 10 is changed to the second position, the body portion 10 may be engaged to the main body 110.

To execute the dehumidifying mode at the second position, the opening 19 may be opened to guide introduction of the outside air. When lower ends of opposite sides of the opening and closing unit 30 pivot by the hinge 81 at the second position and the upper side of the opening and closing unit 30 is pulled down to open the opening 19, the handle 80 is position-changed in a state of being in an upper side, such that the opening and closing unit 30, when opened, may not interfere with the handle 80.

According to an embodiment of the disclosure, opposite ends of the handle 80 may be formed to protrude on opposite side surfaces of the body portion 10. The shape of the handle 80 is not limited thereto, and the position and shape of the handle 80 may be changed variously so as not to interfere with the opening and closing unit 30 when the opening and closing unit 30 is opened.

As such, the flow path switching unit 200 for the dryer 100 according to an embodiment of the disclosure may provide the drying mode and the dehumidifying mode by using one unit, thereby improving user convenience. When a separating unit is used for each mode, a unit not in use has to be kept separately and is likely to be lost. Moreover, according to an embodiment of the disclosure, as functions in the drying mode and in the dehumidifying mode are achieved by one unit, cost may be reduced when compared to manufacturing of a separate unit for each mode.

According to an embodiment of the disclosure, the dryer 100 including the flow path switching unit 200 therefor may be provided.

The dryer 100 is a device for drying a drying material and may provide the drying mode and the dehumidifying mode. The drying mode may be a mode for drying a drying material, and the dehumidifying mode may be a mode for dehumidifying the air outside the dryer.

The dryer 100 according to an embodiment of the disclosure may include the main body 110. The main body 110 may be formed in an approximately rectangular parallelepiped shape including the front surface 101, the back surface 102, the top surface 103, the bottom surface 104, and the side surface 105.

The dryer 100 may include the drum 130 accommodating a drying material. The drum 130 may have an opened side into which the drying material is put. In the main body 110, an entrance 106 communicating with the drum 130 may be formed and a door 120 for opening and closing the entrance 106 may be provided.

The drum 130 may be accommodated and mounted in the main body 110 that forms an exterior of the dryer 100. A manipulation unit 111 may be provided in an upper portion of the front surface 101 of the main body 110 to allow a user to perform a function of the dryer 100. In the manipulation unit 111, a rotation-type input unit 11a for selecting the function of the dryer 100, a display unit 11b for displaying a selection function and a mode state of the dryer 100 according to input of the rotation-type input unit 11a, a touch input unit 11c for allowing the user to select a mode by being pressed, etc., may be provided. However, a configuration of the manipulation unit 111 is not limited thereto and may be implemented in various manners.

Referring to FIG. 2, the dryer 100 may include a heat exchanger 170 that provides hot air to the drum 130. The heat exchanger 170 may be disposed under the drum 130, and may be installed on a base 140 provided on the bottom surface 104 of the main body 110. As shown in FIG. 3, a fan 161 installed on the base 140 may move the air of the drum 130 to a flow path switching unit 200, and the heat exchanger 170 may be provided at a back end of the flow path switching unit 200. The cover 141 may be coupled to an upper portion of the base 140 to form a duct structure that allows air to pass through the flow path switching unit 200 and the heat exchanger 170.

The heat exchanger 170 may be disposed under the drum 130, and may be installed on a base 140 provided on the bottom surface 104 of the main body 110. The heat exchanger 170 may be provided to supply hot air toward the drum 130 and may be a component constituting a refrigerant cycle.

The refrigerant cycle may include the heat exchanger 170, a compressor 180, and an expansion device 190. The heat exchanger 170 may be provided to exchange air with heat and may include an evaporator 171 and a condenser 172. The refrigerant may circulate through a series of processes including compression-condensation-expansion-evaporation. A detailed description of the heat exchanger 170, the compressor 180, and the expansion device 190 has been provided in the description of the flow path switching unit 200 for the dryer 100 and thus will be omitted at this time.

In the dryer 100 according to an embodiment of the disclosure, the flow path switching unit 200 may be attachably and detachably coupled to the main body 110 to provide the first flow path for the drying mode at the first position and the second flow path for the dehumidifying mode at the second position. Referring to FIG. 1, the flow path switching unit 200 according to an embodiment of the disclosure may be attachably and detachably mounted in a right lower portion of the front surface when the main body 110 is viewed from the front surface. The installation position of the flow path switching unit 200 for the dryer 100 may not be limited thereto and may be changed to the left side of the front surface as described above.

The first flow path may be a flow path for providing air from the drum 130 to the heat exchanger 170 when the air inside the main body 110 circulates by sequentially flowing to the drum 130, the flow path switching unit 200, and the heat exchanger 170. The second flow path may be a flow path for introducing the outside air to the heat exchanger 170 and discharging the air from the drum 130 outside when the outside air is introduced through the flow path switching unit 200, passes through the heat exchanger 170 and the drum 130, and then is introduced back to the flow path switching unit 200 and discharged to outside. The flow path switching unit 200 may provide the first flow path at the first position and provide the second flow path at the second position where the top surface and the bottom surface are reversed from the first position.

The dryer 100 according to an embodiment of the disclosure may include the flow path switching unit 200 for the dryer 100 described above, thereby providing a structure, operations, and effects of the flow path switching unit 200 for the dryer 100, such that a redundant description of the flow path switching unit 200 for the dryer 100 will be omitted.

To understand the disclosure, reference numerals have been given in embodiments of the disclosure shown in the drawings, and specific terms are used to describe the embodiments of the disclosure, but the disclosure is not limited by the specific terms, and the disclosure may include all the components that are normally thought by those of ordinary skill in the art.

Certain executions described here are embodiments of the disclosure, not limiting the scope of the disclosure in any way. For the brevity of the specification, the description of conventional electronic configurations, control systems, software, and other functional aspects of the systems may be omitted. Connections of lines or connection members between components shown in the drawings are illustrative of functional connections and/or physical or circuit connections, and in practice, may be represented as alternative or additional various functional connections, physical connections, or circuit connections. In addition, when there is no specific mentioning, such as "essential" or "important", it may not be a necessary component for the application of the disclosure. An expression such as "comprising", "including", etc., used herein has been used to be understood as terms of an open end of the description.

In the specification (especially, claims) of the disclosure, the use of the term "the" and similar indicators thereof may correspond to both the singular and the plural. In addition, when the range is described in the disclosure, the range includes the disclosure to which an individual value falling within the range is applied (unless stated otherwise), and is the same as the description of an individual value constituting the range in the detailed description of the disclosure. Finally, when there is no apparent description of the order of operations constituting the method according to the disclosure or a contrary description thereof, the operations may be performed in an appropriate order. However, the disclosure is not necessarily limited according to the describing order of the operations. The use of all examples or exemplary terms (for example, etc.) in the disclosure are to simply describe the disclosure in detail, and unless the range of the disclosure is not limited by the examples or the exemplary terms unless limited by the claims. In addition, it would be apparent to those of ordinary skill in the art that various modifications and changes may be easily made without departing from the scope and spirit of the disclosure.

A flow path switching unit for a dryer according to an embodiment of the disclosure may use a flow path switching unit that provides a bidirectional flow path for a drying mode and a dehumidifying mode to allow a user to use the drying mode or the dehumidifying mode depending on a use purpose with a single flow path switching unit, thereby improving user convenience, eliminating concerns about storage and loss, and reducing a cost such as a material cost, etc.

The flow path switching unit for a dryer according to an embodiment of the disclosure may be coupled to the dryer, which receives a drying material in a drum and dries the drying material by heat of a heat exchange, to dehumidify outside air.

The flow path switching unit according to an embodiment of the disclosure may include a body portion including a top surface, a bottom surface, and opposite side surfaces.

The flow path switching unit according to an embodiment of the disclosure may include a flow path guide guiding air by dividing an internal space of the body portion and forming a first flow path for drying the drying material or a second flow path for dehumidifying outside air.

The body portion may provide the first flow path for guiding the air from the drum toward the heat exchanger at a first position.

The body portion may provide the second flow path for introducing outside air which is then dehumidified through the drum, and introducing the dehumidified air from the drum to discharge the air outside, at a second position where the top surface and the bottom surface are 180° rotated such that positions of the top surface and the bottom surface are reversed from the first position.

According to an embodiment of the disclosure, the flow path guide may extend from the front of any one of the opposite side surfaces to the back of the other of the opposite side surfaces.

The flow path switching unit according to an embodiment of the disclosure may include, in a state where the body portion is at the first position, a first inlet formed on the side surface through which air is introduced from the drum and an outlet formed on a back of the body portion.

The first flow path of the flow path switching unit according to an embodiment of the disclosure may be formed to allow the air to flow from the first inlet to the outlet.

The flow path switching unit according to an embodiment of the disclosure may include, in a state where the body portion is at the second position, a second inlet formed on the other side surface through which the air is introduced from the drum, a separating wall protruding forward from the flow path guide for division into a first region through which the outside air is introduced and a second region through which the outside air is discharged, and an opening provided to be opened and closed in the flow path guide corresponding to the first region.

The second flow path of the flow path switching unit according to an embodiment of the disclosure may be formed such that the outside air introduced through the opening is introduced through the second inlet after passing through the drum and then is discharged through the second region.

An opening and closing unit for opening and closing a front of the body portion may be coupled to the body portion according to an embodiment of the disclosure.

An airtight member for sealing the opening may be coupled to the opening and closing unit of the flow path switching unit according to an embodiment of the disclosure.

In the flow path switching unit according to an embodiment of the disclosure, the airtight member may open the opening when the opening and closing unit opens the front.

The airtight member of the flow path switching unit according to an embodiment of the disclosure may be formed to have a size corresponding to the opening, and a sealing member may be coupled in a circumferential direction of the airtight member.

In the flow path switching unit according to an embodiment of the disclosure, a guide grill guiding air discharged to outside may be formed in the second region.

In the flow path switching unit according to an embodiment of the disclosure, the guide grill guiding air discharged to outside may be formed in the second region.

The guide grill may introduce the discharged air in a direction away from the separating wall.

In the flow path switching unit according to an embodiment of the disclosure, in the state where the body portion is at the first position, an air dispersion rib may be formed to protrude toward the outlet in the flow path guide.

In the flow path switching unit according to an embodiment of the disclosure, in the state where the body portion is at the second position, the opening and closing unit may be opened by pivoting with respect to a hinge in opposite lower ends thereof.

A distance between opposite side surfaces of the body portion of the flow path switching unit according to an embodiment of the disclosure may be greater than a distance between the front and the back of the body portion.

The separating wall of the flow path switching unit according to an embodiment of the disclosure may be formed in a center of the opposite side surfaces.

An area of the outlet of the flow path switching unit according to an embodiment of the disclosure may be greater than an area of the first inlet and an area of the outlet.

An area of the second region of the flow path switching unit according to an embodiment of the disclosure may be greater than an area of the second outlet.

In the flow path switching unit according to an embodiment of the disclosure, a filter member for filtering out a foreign substance may be coupled to the back of the body portion.

In the flow path switching unit according to an embodiment of the disclosure, a handle for rotating the body portion from the first position to the second position may be provided.

The handle may be formed in a front lower side of the body portion in the state where the body portion is at the first position.

A dryer according to an embodiment of the disclosure may include the flow path switching unit for the dryer.

While example embodiments of the disclosure have been shown and described, the scope of the disclosure is not limited to the description and also includes various modifications and improvements made by those of ordinary skill in the art using the concept of the disclosure defined in the appended claims.

What is claimed is:

1. A flow path switching unit of a dryer configured to dry a drying material, the flow path switching unit comprising:
   a body portion comprising a first surface, a second surface opposite to the first surface, a first side surface, and a second side surface opposite to the first side surface; and
   a flow path guide dividing an internal space of the body portion to selectively form one of a first flow path of air for drying the drying material and a second flow path of air for dehumidifying outside air, according to an arrangement position of the body portion,
   wherein, in a state where the body portion is arranged in the dryer at a first position, the flow path switching unit provides the first flow path to guide air from a drum of the dryer toward a heat exchanger of the dryer,
   wherein, in a state where the body portion is arranged in the dryer at a second position, the flow path switching unit provides the second flow path to guide the outside air introduced from an outside of the dryer toward the heat exchanger and discharge the outside air which has been dehumidified after passing through the heat exchanger and the drum to the outside of the dryer, and
   wherein, in the first position, the body portion is arranged so that the first surface is a top surface of the body portion and the second surface is a bottom surface of the body portion, and in the second position, the body portion is arranged so that the first surface is the bottom surface of the body portion and the second surface is the top surface of the body portion.

2. The flow path switching unit of claim 1, wherein the flow path guide extends from the first side surface to the second side surface,
   wherein the flow path guide comprises:
      a first inlet at the first side surface and configured to, in the state where the body portion is arranged in the dryer at the first position, receive the air from the drum; and
      an outlet at a back surface of the body portion and configured to, in the state where the body portion is arranged in the dryer at the first position, output the air toward the heat exchanger, and
   wherein the first flow path is configured to have the air to flow from the first inlet to the outlet.

3. The flow path switching unit of claim 2, further comprising an air dispersion rib protruding from a surface of the flow path guide toward the outlet.

4. The flow path switching unit of claim 1, wherein the flow path guide extends from the first side surface to the second side surface,
   wherein the flow path guide comprises:
      a second inlet at the second side surface and configured to, in the state where the body portion is arranged in the dryer at the second position, receive the air from the drum;
      a separating wall protruding forward from the flow path guide and dividing the body portion into a first region through which the outside air is introduced in the state where the body portion is arranged in the dryer at the second position and a second region through which the outside air is discharged in the state where the body portion is arranged in the dryer at the second position; and
      an opening configured to be opened and closed in the flow path guide at the first region, and
   wherein the second flow path is configured such that the outside air introduced through the opening is received through the second inlet after passing through the drum, and then is discharged through the second region.

5. The flow path switching unit of claim 4, further comprising:
   an opening and closing unit configured to open and close a front of the body portion; and
   an airtight member coupled to the opening and closing unit and configured to seal the opening,
   wherein the airtight member is further configured to open the opening when the opening and closing unit opens the front.

6. The flow path switching unit of claim 5, wherein the airtight member has a size corresponding to the opening, and
   wherein the flow path switching unit further comprises a sealing member coupled to a perimeter of the airtight member.

7. The flow path switching unit of claim 4, further comprising a guide grill provided in the second region and configured to guide the air to an outside of the body portion.

8. The flow path switching unit of claim 4, further comprising a guide grill provided in the second region and configured to guide the air to an outside of the body portion, and
   wherein the guide grill is further configured to introduce the air in a direction away from the separating wall.

9. The flow path switching unit of claim 4, wherein a distance between the first side surface and the second side surface of the body portion is greater than a distance between the first surface and the second surface, and
   wherein the separating wall is provided a central position between the first side surface and the second side surface.

10. The flow path switching unit of claim 4, wherein an area of the outlet is greater than an area of the first inlet,
    wherein the area of the outlet is greater than an area of the opening, and
    an area of the second region is greater than an area of the second inlet.

11. The flow path switching unit of claim 1, further comprising an opening and closing unit coupled to the body portion and configured to open and close a front of the body portion.

12. The flow path switching unit of claim 11, wherein the opening and closing unit is configured to, in the state where the body portion is at the second position, be opened by pivoting of a hinge of the body portion.

13. The flow path switching unit of claim 1, wherein the body portion comprises a filter member configured to filter out a foreign substance.

14. The flow path switching unit of claim 1, further comprising a handle configured to rotate the body portion from the first position to the second position, wherein the handle is at a front lower side of the body portion in the state where the body portion is at the first position.

15. A dryer comprising the flow path switching unit according to claim 1.

\* \* \* \* \*